UNITED STATES PATENT OFFICE.

JOHN N. HENDERSON, OF NEW ORLEANS, LOUISIANA, ASSIGNOR TO EDWARD CUNNINGHAM, OF NEW ORLEANS, LOUISIANA.

COMPOUND FOR REMOVING SCALE FROM STEAM-BOILERS.

SPECIFICATION forming part of Letters Patent No. 719,002, dated January 27, 1903.

Application filed September 20, 1902. Serial No. 124,222. (No specimens.)

*To all whom it may concern:*

Be it known that I, JOHN N. HENDERSON, a citizen of the United States of America, residing at New Orleans, in the parish of Orleans and State of Louisiana, have invented certain new and useful Improvements in Compounds for Removing Scale from Steam-Boilers, of which the following is a specification.

This invention relates to compounds for removing scale from steam-boilers, and, unlike most compounds of this kind, it is perfectly harmless to the iron.

The compound is put up in any suitable packages and in quantities to suit and is fed to the boiler in about the following amounts, viz: ten to twenty horse-power, one-half gallon per week; twenty to forty horse-power, one gallon per week; forty to sixty horse-power, two gallons per week; sixty to one hundred horse-power, four gallons per week; one hundred to two hundred horse-power, five gallons per week. These amounts will change according to the water and condition of boiler.

The compound is made up as follows: forty pounds parched ground coffee, two pounds extract of logwood, one pound blood-meal, three pounds salt, all thoroughly mixed in about fifty gallons of water. The amount of water may vary according to the strength which it may be desired to give to the compound. When mixed, it is fed to the boiler in about the proportions before mentioned.

Having described my invention, what I claim is—

A compound for removing scale from steam-boilers composed of the following ingredients: parched ground coffee, extract of logwood, blood-meal, salt, all thoroughly mixed with water, substantially as described and for the purpose set forth.

In testimony whereof I affix my signature in presence of two witnesses.

JOHN N. HENDERSON.

Witnesses:
    W. H. COOK,
    FRED. C. COOK.